L. W. CHISM.
CONNECTING DEVICE.
APPLICATION FILED OCT. 24, 1918.

1,310,979.

Patented July 22, 1919.
2 SHEETS—SHEET 1.

WITNESS:
Thos. W. Riley

INVENTOR.
Louis W. Chism
BY Wm. H. Babcock & Son
ATTORNEYS

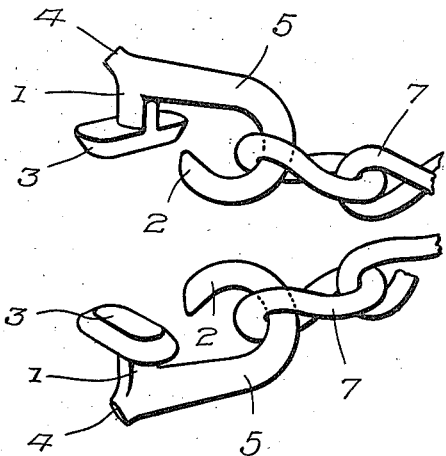
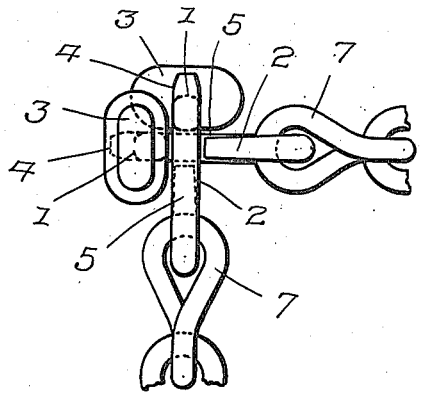
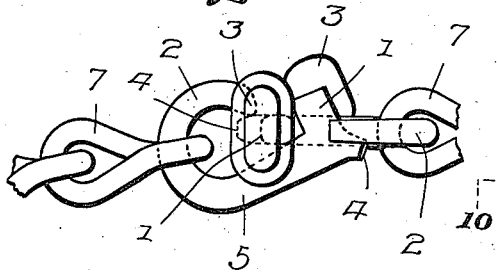
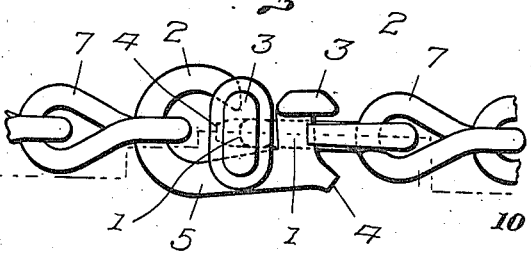
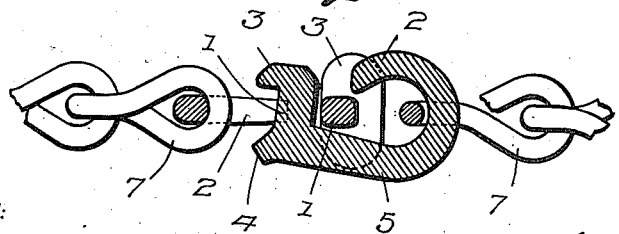

UNITED STATES PATENT OFFICE.

LOUIS W. CHISM, OF PLANTSVILLE, CONNECTICUT, ASSIGNOR TO THE STEEL PRODUCTS COMPANY, OF HARTFORD, CONNECTICUT, A CORPORATION OF CONNECTICUT.

CONNECTING DEVICE.

1,310,979.      Specification of Letters Patent.      Patented July 22, 1919.

Application filed October 24, 1918. Serial No. 259,519.

*To all whom it may concern:*

Be it known that I, LOUIS W. CHISM, a citizen of the United States, residing at Plantsville, in the county of Hartford and State of Connecticut, have invented certain new and useful Improvements in Connecting Devices, of which the following is a specification.

This invention relates to connecting devices of the open hook or link type intended more for use in connecting the terminal parts of a chain or other element to some relatively fixed part and also to be used as a repair link or connector in case such chain or other element should become broken, or for connecting two chains or other elements together, and the uses primarily in view by applicant are the connecting of the terminal portions of a traction or anti-skidding chain or element to an element rigidly mounted and anchored on a truck wheel, and the repair of such traction chains or elements in case of breakage.

The main object is to provide a connecting device of this type which may be used equally well to connect the terminal portions of the traction chain or element to said fixed rigid element or to serve, in connection with a duplicate connecting device, as a repair link.

Other objects are to provide a connecting device so formed that it can not be separated from the fixed element so long as the terminal portion of the traction chain or element remains in normal position on said device; to so form said device that the link of the traction chain can not pull or drop out of its normal position, but can only be moved out of normal position by careful manual manipulation; to provide a connecting device that may be used with a duplicate thereof as a repair link for chains or other traction elements, the parts of which link can only be separated when at substantially right angles to each other, which will be held out of such position by the pull on the chains across the tire, which will have its two parts so formed that the plate and stud of the one device will protect the bill of the hook of the other device, and vice versa, which will have no sharp points to cut the tire, which has no parts liable to be bent out and dig into the tire, and which will occupy substantially no more transverse area than the regular chain links and will do no more damage to the tire than the ordinary chain link.

Figure 1:
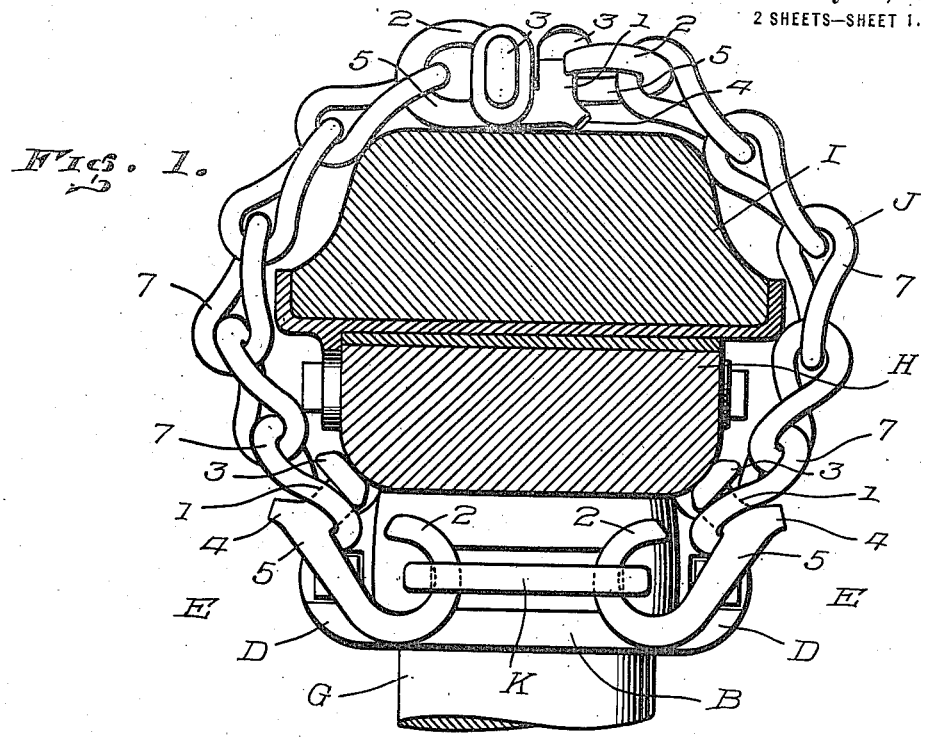
Figure 3:
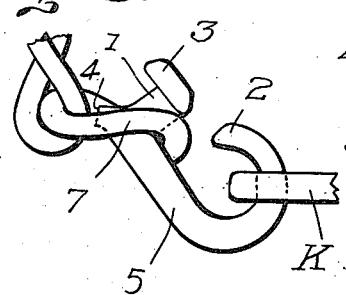
Figure 4:
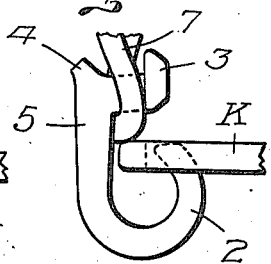
Figure 5:
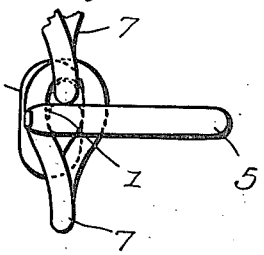
Figure 2:
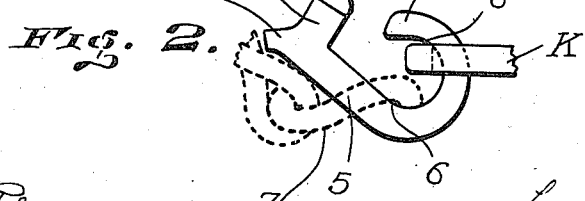

In the accompanying drawings forming a part hereof:

Figure 1 represents a front elevation of two devices embodying my invention as used to connect the terminal links of a traction chain to the eye of a spoke clamp, and two of said devices as used in coöperation as a repair link in said chain, the tire, rim and felly being shown in section, and the spoke being broken away;

Fig. 2, a detail view of one of said devices during application to the eye of the plate, the chain link being shown in dotted lines in the only position wherein it will allow the eye of the plate to pass between it and the opposing face of the hook;

Fig. 3, a detail view of one of such devices showing one of the terminal links of the traction chain in the act of being passed over the lug 4 into normal position;

Fig. 4, a detail view, showing the terminal link acting as a stop or lock;

Fig. 5, a detail view of one of the hooks, showing its position and the position of its respective terminal link with relation thereto with the chain slack;

Fig. 6, a perspective detail view of two superposed connecting devices just prior to fitting together to be used as a repair link and in their relative positions permitting such fitting together, the bill of each hook receiving a link of the chain;

Fig. 7, a top plan view of such devices in their first position after such fitting together;

Fig. 8, a similar view of such devices in their second position after such fitting together;

Fig. 9, a similar view of such devices in their third, and final, position after such fitting together; and Fig. 10, a sectional view on line 10—10 of Fig. 9.

Referring now in detail to the drawings:

B indicates one of the plates of a two plate clamp, the plates of which are provided with perforated end flanges D for the reception of bolts E on which wing nuts are screwed to draw the two plates toward each other on the outer portion of a spoke G of the wheel near the felly H on which is mounted the tire I. J indicates one of the transverse anti-skidding or traction chains of the fixed point or anchored type connected at each end to the eye or strap K of plate B of the clamp by means of two of my connecting devices. As thus far described all parts, excepting such connecting devices, are old, being shown merely to illustrate one manner of anchoring in one of the preferred uses. Any other suitable form of clamp or of spoke, felly or rim clamp or plate, provided with an eye, may be used equally well, and while referring hereinafter to the above parts in explanation of the construction and operation of my invention when used to connect the terminal parts of the traction chain or element to a fixed element on the wheel I am not to be understood as limiting my invention to use solely with said parts.

My invention resides more particularly in a connecting device made in the form of a hook and in providing the same at its butt with a stud 1 extending up beyond the bill 2 of the hook and mounting on the upper end of said stud an enlarged button 3 extending laterally of said stud and transversely of the bill of the hook and in providing the lower and rear end of said stud 1 with a rounded lug 4.

The opening between the end of the bill 2 and the adjacent faces of the button 3 and stud 1 will be sufficient to permit the passage of one side of the usual size truck traction chain link, stem 5 of a similar hook, or the eye K of the plate B, successively, according to the intended use, while the distance between the inner face of the stud and the bill 2 of the hook is not sufficient to permit the passage therethrough simultaneously of portions of two links, or of a link and said eye K or of a link and stem 5 of a similar hook.

The opposing faces of the eye of the hook will not be at a distance from each other equaling twice the distance between the bill 2 and the inner face of the stud 1 except at one point, indicated by 6, where said faces are sufficiently removed from each other to allow the eye K of the plate B to pass between the inner face of the bill 2 and the face of the terminal link 7 of the chain J.

In operation, when used as a connecting device for connecting the terminal links of the chain J to the eye K of plate B, the terminal link 7 of one end of the chain will be passed over the bill 2 of its respective hook, the bill 2 of which will then be passed through the eye K of the plate B. The link 7 is then moved to point 6 on the stem 5 and the hook is to be moved toward the hub of the wheel until the eye K passes the link 7, as shown in Fig. 2, when the link 7 is to be moved along the stem 5 of the hook until its inner face strikes the inner face of stud 1, when it is to be turned endwise over the lug 4, as shown in Fig. 3, until it lies between said lug 4 and the button 3, and surrounds the stud 1. The button 3 and lug 4 will serve as guards to keep it in this, its normal position, the lug 4 serving as a guide to deflect said link and prevent its moving off of said stud in case it should drop toward the hub of the wheel by reason of slack in the chain.

It is obvious that so long as this link 7 remains in its above described normal position it will effectually close the interval between the bill 2 and the adjacent faces of the stud 1 and button 3 against the passage of the eye K of the plate B, so that no matter what position the hook may assume it cannot become accidentally separated from the plate B.

When a repair link is needed, two of these hooks are employed, the terminal links 7 on each side of the break in the chain being slipped over the respective bills of the hooks, which are then held at right angles to each other with their open sides presented toward each other, as shown in Fig. 6, when they are fitted together, as shown in Fig. 7, and twisted through the position shown in Fig. 8 when they assume their final relative positions shown in Fig. 9, with the terminal links 7 held by the bills 2 of the respective hooks, when the interval between the bill 2 and the adjacent faces of the button 3 and stud 1 of one hook will be closed by the button 3 and stud 1 of the other hook, and vice versa, and the tension of the chain on said hooks will keep them in this, their normal, position.

Each of said hooks will preferably be made of forged steel, but need not necessarily be so made.

Having thus described my invention, what I claim as new and desire to secure by Letters Patent is:

1. A connecting device of hook form having an opening and provided with a headed stud, the head of which corresponds in size substantially to the dimension of the curve of the hook, said device being and so formed that it may be used either to connect an element to a fixed object, the element thus connected serving to close said opening against the passage therethrough of said object, or may be used as a part of a repair link comprising two such devices, in this latter use the opening of each of said devices being closed by a portion of the other of said devices and the elements connected thereby being held by the bills of the respective devices.

2. A connecting device having an opening adjacent its butt and provided with a stud at its butt, on the upper end of which stud is mounted a button which extends transversely of the device and rearwardly of said stud, the distance between the inner faces of all portions of said stud and button and the bill of the device being sufficient to permit the passage successively of portions of elements to be connected by said device, but insufficient to permit the passage of portions of two such elements simultaneously.

3. A connecting device having an opening adjacent its butt and provided with a stud at its butt, on the upper end of which stud is mounted a button, the lower end of said stud being provided with a rearwardly presented lug, said button and lug serving to keep an additional element in normal position on said stud, the distance between the inner faces of all portions of said stud and button and the bill of the device being sufficient to permit the passage successively of portions of the elements to be connected by said device, but insufficient to permit the passage of portions of two of such elements simultaneously, and the inner faces of said device being too close to permit the passage of two such elements simultaneously except at one point, which is remote from said opening.

4. A connecting device comprising a hook having an opening and provided with an offset button portion adjacent said opening, said button portion exceeding in at least one dimension the distance between the interior faces of said device adjacent said opening.

5. A connecting device comprising a hook having an opening and provided with an offset button portion adjacent said opening, said button portion exceeding in all directions the distance between the interior faces of said device adjacent said opening.

6. A connecting device comprising a hook having an opening and provided with an offset button portion and adapted to be used with a device of the same construction and dimensions, the button portion corresponding in two directions substantially to the size of the area within the connecting device and exceeding the width of such area at one point.

In testimony whereof I have signed my name to this specification in the presence of two subscribing witnesses.

LOUIS W. CHISM.

Witnesses:
L. B. POWELL,
WARREN D. CHASE.